US008280388B2

(12) United States Patent
Leung Hang et al.

(10) Patent No.: US 8,280,388 B2
(45) Date of Patent: Oct. 2, 2012

(54) SYSTEMS AND METHODS FOR MANAGING WIRELESS COMMUNICATIONS USING LINK SPACE INFORMATION

(75) Inventors: Jason C. Leung Hang, Yueng Long (CN); Bill Piu Wong, Causeway Bay (CN)

(73) Assignee: Hong Kong Applied Science and Technology Research Institute Co., Ltd., Hong Kong (CN)

( * ) Notice: Subject to any disclaimer, the term of this patent is extended or adjusted under 35 U.S.C. 154(b) by 1232 days.

(21) Appl. No.: 12/049,933

(22) Filed: Mar. 17, 2008

(65) Prior Publication Data

US 2008/0214116 A1    Sep. 4, 2008

Related U.S. Application Data

(62) Division of application No. 10/274,834, filed on Oct. 21, 2002, now Pat. No. 7,366,519.

(51) Int. Cl.
*H04W 72/00* (2009.01)
*H04B 17/00* (2006.01)

(52) U.S. Cl. ................. 455/450; 455/67.11; 455/423

(58) Field of Classification Search .............. 455/403, 455/405, 410, 422, 423, 445, 446, 450, 452.1, 455/453, 560, 67.11; 370/242, 244, 254, 370/426
See application file for complete search history.

(56) References Cited

U.S. PATENT DOCUMENTS

| | | | |
|---|---|---|---|
| 5,276,907 A | 1/1994 | Meidan | |
| 5,802,473 A | 9/1998 | Rutledge et al. | |
| 6,111,857 A | 8/2000 | Soliman et al. | |
| 6,118,936 A | 9/2000 | Lauer et al. | |
| 6,553,020 B1 | 4/2003 | Hughes et al. | |
| 6,754,470 B2 | 6/2004 | Hendrickson et al. | |
| 6,829,491 B1 | 12/2004 | Yea et al. | |
| 6,873,601 B1 | 3/2005 | Chow et al. | |
| 6,895,014 B2 | 5/2005 | Simbirski et al. | |
| 2002/0068559 A1 | 6/2002 | Sharma et al. | |
| 2002/0142788 A1 | 10/2002 | Chawla et al. | |

FOREIGN PATENT DOCUMENTS

| | | |
|---|---|---|
| EP | 1039689 | 9/2000 |
| JP | 10-041969 | 2/1998 |
| WO | WO-02/080597 | 10/2002 |

OTHER PUBLICATIONS

European Search Report for EP03256461, dated May 19, 2004.
Japanese Office Action issued for JP-2003-355,961, dated Jun. 6, 2009 (8 pages, with English translation).

*Primary Examiner* — Quochien B Vuong
(74) *Attorney, Agent, or Firm* — Fulbright & Jaworski L.L.P.

(57) ABSTRACT

Disclosed are systems and methods which provide for management of wireless communications through the development and use of link space information. Such link space information provides link-centric information with respect to wireless links of a network to thereby provide a view of the network which takes into account phenomena affecting the wireless links. Utilizing such link space information, automated management of various aspects of a wireless network may be provided, including automated provisioning, management, and/or optimization of network links. Network operations may include use of link space information in providing network management applications such as automatic fault management, automatic performance management, operation advisories, and/or the like.

33 Claims, 2 Drawing Sheets

SYSTEMS AND METHODS FOR MANAGING WIRELESS COMMUNICATIONS USING LINK SPACE INFORMATION

CROSS-REFERENCE TO RELATED APPLICATIONS

This application is a divisional of U.S. patent application Ser. No. 10/274,834, entitled, "SYSTEMS AND METHODS FOR MANAGING WIRELESS COMMUNICATIONS USING LINK SPACE INFORMATION," filed Oct. 21, 2002, the disclosure of which is hereby incorporated by reference herein.

TECHNICAL FIELD

The present invention is directed toward wireless communications and, more particularly, to the development and use of link space information for managing wireless communications.

BACKGROUND OF THE INVENTION

The use of wireless links in providing information communication has continued to grow in recent years. Use of cellular telephones, including analog systems such as those based upon the advanced mobile phone system (AMPS) technology and digital systems such as personal communication services (PCS) phones based upon code division multiple access (CDMA) and time division multiple access (TDMA) techniques, e.g., those of global system for mobiles (GSM). Additionally, wireless communication has become widespread in providing data communication, such as point to point and point to multi-point wireless communication systems including those of the BLACKBERRY personal digital assistant (PDA) and WEBLINK WIRELESS networks. Moreover, as wireless communication becomes more and more ubiquitous wireless networks having a more localized service area have become widespread, such as wireless local area networks (WLANs) utilizing IEEE 802.11 and BLUETOOTH technology.

However, it should be appreciated that the available spectrum for radio frequency (RF) wireless communication is somewhat limited. The spectrum from approximately 10 KHz to approximately 100 GHz substantially comprises the radio spectrum available for communication today, with RF wireless communication primarily occupying the spectrum below around 40 GHz. As wireless communications become more and more ubiquitous, portions of the radio spectrum have become very crowded. Although it is possible to establish wireless communications in a less crowded portion of the radio spectrum, such as moving communications to the 60 GHz range and beyond, it is typically not an easy task to implement wireless communications in such bands. For example, implementing wireless communications in the high end of the spectrum typically has costs associated therewith including significant signal attenuation due to obstacles, such as walls, buildings, foliage, and topographical attributes, and even due to water and water vapor in the air. Moreover, the radio spectrum is typically heavily regulated and controlled by governments, such as by the Federal Communications Commission (FCC) in the United States, providing for particular uses of the spectrum in both licensed and unlicensed bands.

Accordingly, those deploying, maintaining, and/or using wireless communication links are often relegated to relatively crowded frequency bands. Accordingly, at least some wireless communication infrastructure providers have invested large amounts of time and money in managing the use of their frequency band.

For example, cellular telephone infrastructure providers have developed detailed frequency reuse plans in an attempt to achieve a maximum amount of reuse of communication channels with an acceptable amount of mutual interference. Additionally, highly skilled RF engineers have been employed with respect to such cellular networks to map effective radiation patterns and to make adjustments at antenna sights in an attempt to minimize mutual interference. However, such wireless communication management has not been without difficulty. For example, the aforementioned frequency reuse plans are often quite complex, requiring significant resources to plan and deploy, and typically present substantial complications when changes are implemented, such as to implement new or more channels at a cell, to alter the directivity of an antenna configuration, and/or to deploy micro-cells in the reuse pattern. Additionally, the highly skilled RF engineers utilized with respect to management of such networks are an expensive and typically limited resource and often are not provided with a level of detail with respect information regarding the actual operation of the network to fully optimize the management thereof. Moreover, the management of such networks often ignores or is unable to fully account for all sources of degraded operation, such as the existence and/or location of external sources of interference.

Often, however, wireless communication networks are implemented without even the benefit of the aforementioned management resources. For example, WLANs, such as those operable according to the IEEE 802.11 protocol, are typically deployed, maintained, and/or used by individuals or a relatively small user base. Accordingly, it is impracticable or impossible to provide resources in the way of frequency or radiation pattern planning, such as due to cost, personnel, and/or training issues. Indeed, a substantial number of such networks are simply deployed in a "best guess" configuration and remain substantially unattended unless and until a critical fault is detected. Accordingly, such networks are often left to operate at reduced capacity and/or quality.

A need, therefore, exists in the art for systems and methods for managing wireless communications. A further need exists in the art for such systems and methods to optimize operation of wireless communication networks without requiring the use of RF engineers or similarly highly skilled technicians.

BRIEF SUMMARY OF THE INVENTION

The present invention is directed to systems and methods which provide for management of wireless communications through the development and use of link space information. Link space information of the present invention provides link-centric information with respect to wireless links of a network to thereby provide a view of the network which takes into account phenomena affecting the wireless links. Link space information of the preferred embodiment includes not only the nodes connected by a wireless link, but also link quality information and an aspect of physical information with respect to the link.

Embodiments of the present invention utilize the knowledge that nodes in a RF wireless network have RF links having certain attributes associated therewith providing connections in the RF domain. These attributes are utilized according to embodiments of the present invention, not only to establish link or connection topology information between the various nodes, but also to derive a more robust link space network view. For example, the signal strength of a link can tell user how good the link is. Moreover, additional information may be gleaned from link signal strength, such as an indication of the physical and/or effective radiation proximity between two nodes of the link.

Link attributes utilized in developing link space information of the present invention may include such attributes as signal strength, error rate (frame, bit, etcetera), transmit power, antenna pattern, frequency (and/or other channel information), data rate, network topology, antenna diversity characteristics, and the like. Such link space information may be utilized according to the present invention to increase network performance and/or to provide any number of interesting and useful network management applications.

Embodiments of the present invention provide for automated management of various aspects of a wireless network. For example, the aforementioned link space information may be utilized in providing automated provisioning, management, and/or optimization of network links. According to embodiments of the present invention, control algorithms are deployed with respect to a wireless network, such as at a centralized operations and maintenance server and/or distributed throughout nodes thereof (e.g., network access points (APs)), for controlling wireless nodes (e.g., APs, user terminals, etcetera) to manage aspects of the network, such as to optimize link and network performance. Such control of network operation may include use of link space information in providing network management applications such as automatic fault management, automatic performance management, operation advisories, and/or the like.

For example, fault management provided according to the present invention may include maximization or optimization of wireless coverage (e.g., determining and implementing service areas for increased capacity and/or to ensure link availability), interference control schemes (e.g., controlling antenna patterns and/or minimizing transmit power levels to minimize signal energy leakage outside the network and/or areas thereof), unintended RF party detection (e.g., employing techniques to detect a RF party external to the network and employ an interference avoidance scheme), and the like. Performance management according to the present invention may include adaptive service area/cell shaping and control (e.g., determining and implementing service area shaping for load balancing), channel reuse planning (e.g., determining and deploying channel reuse schemes), reduction and/or mitigation of problems associated with hidden terminals (e.g., coordination of network links to facilitate satisfactory or optimized links with respect to all terminals of the network), and the like. Providing operation advisories according to the present invention may include presentation of network condition (e.g., developing and outputting graphical representations of network topology and/or other network link status information), network optimization advice and fault notification (e.g., issue alerts when particular network components fail or otherwise malfunction and/or determine sources of network inefficiencies and present data helpful in optimizing the operation thereof), and the like.

In addition to or in the alternative to the aforementioned network management applications provided according to embodiments of the present invention, link space information may be utilized in providing a foundation for implementing network configuration on a more fundamental level. For example, link space information, being link-centric in nature, may be utilized in implementing a wireless distribution system (WDS) and adhoc wireless networking by calculating paths to provide a best network routing strategy. Similarly, link space information of the present invention may be utilized as a foundation for any location based service.

Accordingly, a technical advantage of embodiments of the present invention is provided in managing wireless communications. A further technical advantage of embodiments of the present invention is provided by systems and methods which optimize operation of wireless communication networks using link space information.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
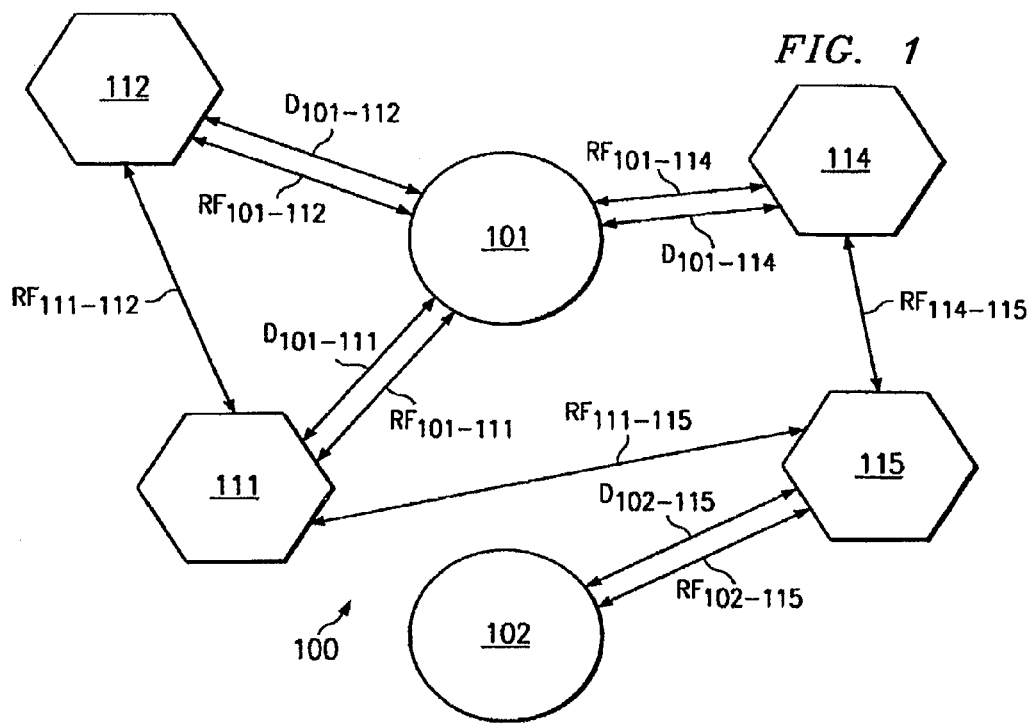
FIG. 1 shows a representative wireless network (or portion thereof) configuration from which data may be collected and for which management may be provided by embodiments of the present invention.

Directing attention to FIG. 1, a portion of a network in which wireless links are utilized for providing data communication is shown generally as network 100. Network 100 comprises a plurality of wireless nodes 101, 102, and 111-115. These wireless nodes may provide various functionality and features. For example, nodes 101 and 102 may comprise wireless access points (APs) such as may be utilized to provide wireless connectivity to a shared resource (not shown), such as a local area network (LAN), a metropolitan area network (MAN), a wide area network (WAN), an intranet, the Internet, a public switched telephone network, a server, an input/output device (e.g., printers, scanners, etcetera), a database, and/or the like. Nodes 111-115 may comprise wireless user or terminal devices, such as workstations, personal computers, personal digital assistants (PDAs), telephony devices, an input/output device, and/or the like.

As shown in FIG. 1, a variety of links may exist with respect to network 100 connecting the nodes thereof. For example, although perhaps not utilized in providing information communication between nodes of network 100, RF links may exist between each wireless node deployed within a radiation or antenna pattern of another wireless node. Shown in FIG. 1 are RF link $RF_{101\text{-}111}$ between node 101 and node 111, RF link $RF_{101\text{-}112}$ between node 101 and node 112, RF link $RF_{101\text{-}114}$ between node 101 and node 114, RF link $RF_{111\text{-}112}$ between node 111 and node 112, RF link $RF_{111\text{-}115}$ between node 111 and node 115, RF link $RF_{114\text{-}115}$ between node 114 and node 115, and RF link $RF_{102\text{-}115}$ between node 102 and node 115.

Various data links may be established for providing information communication between the various nodes. Such data links may be implemented using one or more of the aforementioned RF links. Data link $D_{101\text{-}111}$ is shown providing information communication between node 101 and node 111, data link $D_{101\text{-}112}$ is shown providing information communication between node 101 and node 112, and data link $D_{101\text{-}114}$ is shown providing information communication between node 101 and node 114. Similarly, data link $D_{102\text{-}115}$ is shown providing information communication between node 102 and node 115.

It should be appreciated that links in addition to or in alternative to those shown in FIG. 1 may exist in network 100. For example, although not shown in FIG. 1 for simplification, more than one RF link may exist between nodes of the network, such as through the use of diversity techniques including spatial diversity, angular diversity, and/or polarization diversity. Data links (not shown), whether established using a corresponding RF link, optical link, or wireline link, may provide information communication between various network nodes. For example, nodes 101 and 102 may comprise APs providing shared access to a network, such as a LAN, MAN, WAN, an intranet, the Internet, and/or a telephony network, and this network may provide a data link between nodes 101 and 102.

Preferred embodiments shall be described herein with reference to a wireless local area network, such as may be operable using the IEEE 802.11 protocol, in order to provide specific examples to aid in the understanding of the concepts of the present invention. However, it should be appreciated that the technology of the present invention is applicable to any wireless network, whether providing communication of data, voice, video, and/or combinations thereof, and irrespective of whether operating in licensed or unlicensed bands. Moreover, the concepts of the present invention are applicable to any number of channelization schemes, including frequency division multiple access (FDMA), time division multiple access (TDMA), code division multiple access (CDMA), and combinations thereof.

It should be appreciated that technical personnel utilized in providing for deployment and management of various types of wireless network infrastructure often do not possess as diverse of skill set as may be desirable. For example, in wireless networks traditionally thought of as primarily RF infrastructure, such as cellular telephone networks, RF engineers are often employed to the exclusion of information technology personnel (i.e., data network managers). Although such personnel generally have excellent experience in addressing issues with respect to radio propagation, they often have limited insight with respect to core data networking issues, such as traffic routing and balancing. Contrariwise, in wireless networks traditionally thought of as primarily data networking infrastructure, such as WLANs, information technology personnel are often employed to the exclusion of RF engineers. Although such personnel generally have excellent experience in addressing core data networking issues, they often have limited insight with respect to radio propagation, such as channel reuse, fading and shadowing of signals, and interference mitigation. Accordingly, embodiments of the present invention provide network management tools which combine aspects of both RF and data networking expert knowledge to facilitate optimized management of a wireless network.

In providing network management, such as within a LAN, analysis and decisions are often based solely upon traffic information with respect to the network. However, with the emergence of wireless networking, such as WLANs implementing the IEEE 802.11 protocol, information with respect to attributes in the RF domain, such as signal strength, may be generated or otherwise available without their being utilized in network management. Preferred embodiments of the present invention utilize such RF domain information in developing a link space view of the network. Accordingly, embodiments of the present invention gather RF link attribute information to develop link space information and provide network users (e.g., a network manager) a robust picture for the wireless network condition.

Embodiments of the present invention provide systems and methods operable with network elements, such as nodes 101 and 102 and nodes 111-115, to derive link space information and/or introduce a RF network management system which provides for automatic fine tuning or optimizing of the network and/or providing an advisory service with respect to the operation thereof. The present invention may comprise a centralized set of control algorithms, such as at one or more centralized operations and maintenance servers, perhaps utilizing agents deployed throughout a network for data collection and/or to implement configuration control. Additionally or alternatively, the present invention may comprise a distributed architecture, such as control algorithms distributed throughout nodes thereof, perhaps utilizing information communication therebetween for coordinated management control.

Link space information of the present invention is a function of RF link properties associated with the network environment, antenna patterns, link attributes (such as transmission power levels, channels utilized, antenna/signal diversity), etcetera. Network management systems utilizing such link space information may operate to control network operational aspects, such as to optimize data throughput, by controlling antenna patterns, transmission power levels, channel reuse, load balancing, and the like. Accordingly, the link space itself may be altered by such network management operations. Embodiments of the present invention may implement an iterative process of deriving link space information, implementing management control over network elements, redetermining link space information, and again implementing management control over network elements. However, as will be better appreciated from the discussion which follows, embodiments of the present invention may implement intelligence, such as derived from historical information, to efficiently arrive at an optimum network configuration. For example, a matrix of network element configuration information may be developed and stored and correlated to particular link space situations by a network management system of the present invention such that when the current link space information or a portion thereof corresponds to such a link space situation a predetermined management response results from the stored network element configuration information. Such a matrix may be developed from past operation of the particular network in which it is implemented and/or may be of a more general nature, such as predicted or generally experienced conditions. Using such information, link space changes may be implemented more quickly, e.g., avoiding iterative steps to arrive at an optimized solution for a particular situation. Moreover, such information may be utilized in avoiding management responses which from the link space information appear to be appropriate but which are known to result in undesired network operation, e.g., network configurations that have proven to provide undesired results in the past.

Figure 2A:
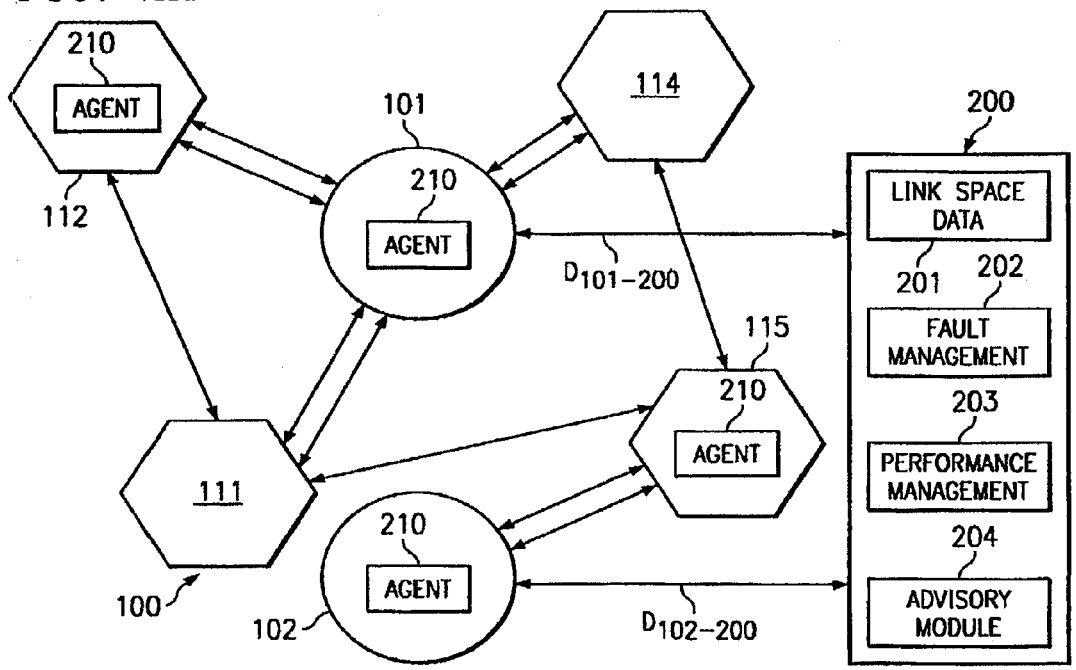
FIG. 2A shows the wireless network (or portion thereof) of FIG. 1 having one embodiment of a link space management system deployed with respect thereto.

Directing attention to FIG. 2A, a preferred embodiment of the present invention implementing centralized management is shown. As illustrated in FIG. 2A, link space management system 200 is deployed as a centralized server in data communication with various network elements of network 100. Link space management system 200 of FIG. 2A may comprise a processor-based system (e.g., general purpose computer system) having an instruction set (e.g., application or control program) operable thereon defining operation as described herein. Link space management system 200 is shown to employ data link $D_{101-200}$ to establish information communication with node 101 and data link $D_{102-200}$ to establish information communication with node 102. It should be appreciated that link space management system 200 may be in data communication with any number of network elements and, therefore, is not limited to use of the particular links shown. For example, link space management system 200 may be in data communication with any or all of nodes 111-115, perhaps using a plurality of data links, such as data links $D_{101-200}$ and $D_{101-111}$ for providing information communication with respect to node 111. Moreover, it should be appreciated that links utilized by link space management system 200 may utilize any available media, including wireline, wireless, optical, and combinations thereof. For example, data links $D_{101-200}$ and $D_{102-200}$ may comprise the aforementioned network otherwise coupling nodes 101 and 102.

Although providing a centralized configuration, it should be appreciated that link space management system 200 of FIG. 2A may utilize cooperative management aspects of the various network elements, such as data collectors and/or control actuators disposed at various nodes of network 100. The illustrated embodiment includes agents 210 deployed at nodes 101, 102, 112, and 115 of network 100. It should be appreciated that the particular deployment of agents 210 shown is exemplary and does not represent any limitation with respect to the present invention. For example, one or more access points, such as nodes 101 and 102, may not host an agent. Similarly, any number of client nodes, such as nodes 111-115, may host an agent.

Agents 210 of a preferred embodiment may comprise software agents, such as may be pushed to nodes by link space management system 200 or otherwise delivered to the appropriate nodes. Software agents utilized according to the present invention may collect information for providing to link space management system 200 to be utilized in developing link space information, such as to create and/or update link space data 201. Additionally or alternatively, software agents utilized according to the present invention may be responsive to control signals from link space management system 200 for controlling operation of the network, such as in response to fault management 202 and/or performance management 203. Accordingly, using software agents of the preferred embodiments nodes of the network can be enlisted as link space sensors and/or network management actuators.

It should be appreciated that link attribute information and/or response to control signals may be provided by various nodes without use of the aforementioned agents and, therefore, link space management systems of the present invention may interact with such nodes without agent 210 operable thereon.

Figure 2B:
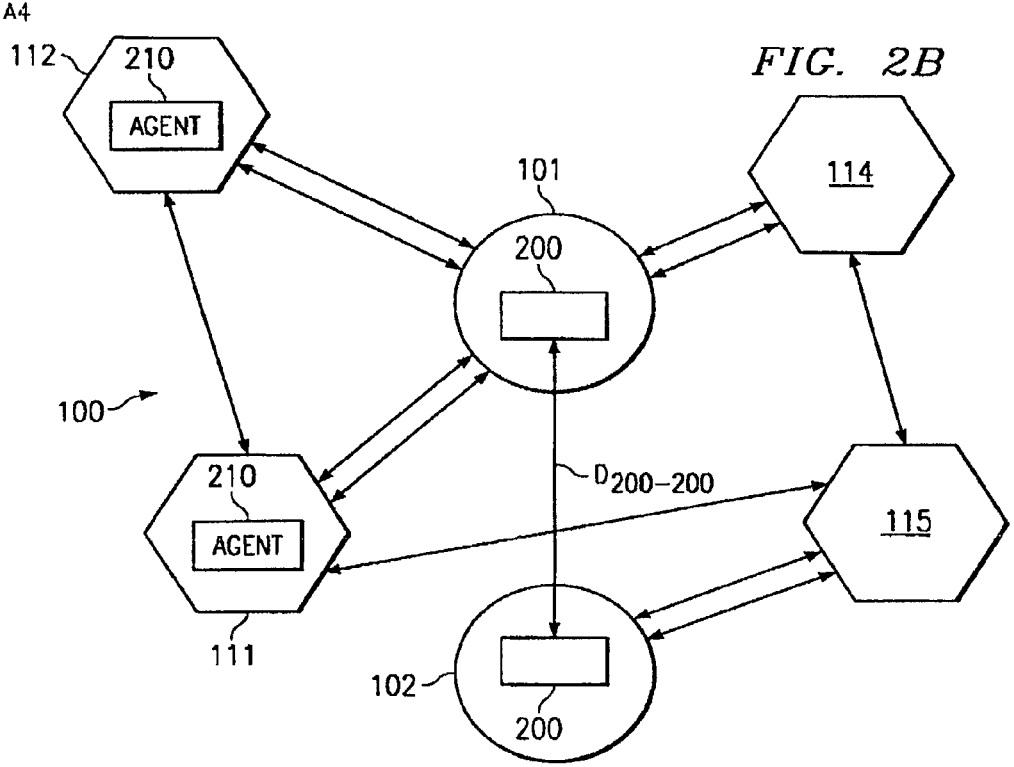
FIG. 2B shows the wireless network (or portion thereof) of FIG. 1 having another embodiment of a link space management system deployed with respect thereto.

Directing attention to FIG. 2B, an alternative embodiment of the present invention implementing de-centralized or distributed management is shown. As illustrated in FIG. 2B, link space management system 200 is deployed as a distributed resource at a plurality of network elements of network 100. Specifically, link space management system 200 is shown deployed as a part of node 101 and as a part of node 102. Preferably, link space management system 200 of FIG. 2B comprises an instruction set (e.g., application or control program) operable upon a processor-based system (e.g., processor platform of a corresponding network element) to provide operation as described herein. According to a preferred embodiment, a same or substantially same set of instructions are operable upon each of the nodes of network 100 having link space management system 200 deployed thereat, preferably providing the functional aspects outlined with respect to link space management system 200 of FIG. 2A. However, embodiments of the present invention may utilize different instruction sets, such as to correspond to the features and functionality of a particular network node, for one or more nodes of network 100 having link space management system 200 deployed thereat. It should be appreciated that embodiments of the present invention may implement combinations of distributed and centralized link space management systems throughout a network, if desired.

Irrespective of their particular configuration, link space management systems 200 of the distributed management configuration of FIG. 2B are preferably in communication with one another to facilitate coordinated management of network 100. Accordingly, the illustrated embodiment employs data link $D_{200-200}$ to establish information between link space management systems 200, and therefore nodes 101 and 102. Additionally or alternatively, each link space management system 200 of a distributed management configuration may be in communication with various network elements of network 100 and, therefore, is not limited to use of the particular links shown. For example, each link space management system 200 of FIG. 2B may be in data communication with any or all of nodes 111-115, such as the subset of nodes served by a corresponding one of nodes 101 and 102. Moreover, it should be appreciated that links utilized by link space management system 200 may utilize any available media, including wireline, wireless, optical, and combinations thereof.

When implemented in software, elements of the link space management system and/or corresponding agents of the present invention are essentially the code segments to perform as described herein. The program or code segments can be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, an intranet, etcetera.

It should be appreciated that the aforementioned software implementations may be deployed with respect to a network without substantial alteration of the network elements thereof. For example, agents may be configured to be accepted in RAM or ROM of APs and/or other node devices without alteration of the hardware configuration. Additionally or alternatively, embodiments of the present invention may rely upon relatively slight hardware modification of network elements, such as to add sufficient memory to an AP to host a link space management system of the present invention implemented in software. Similarly, embodiments of the present invention may utilize substantial modification of network elements, such as to add a smart antenna system to APs and/or client nodes, to add sensors for collecting particular data, to add actuators to respond to control codes for achieving desired network configuration, etcetera.

Figure 3:
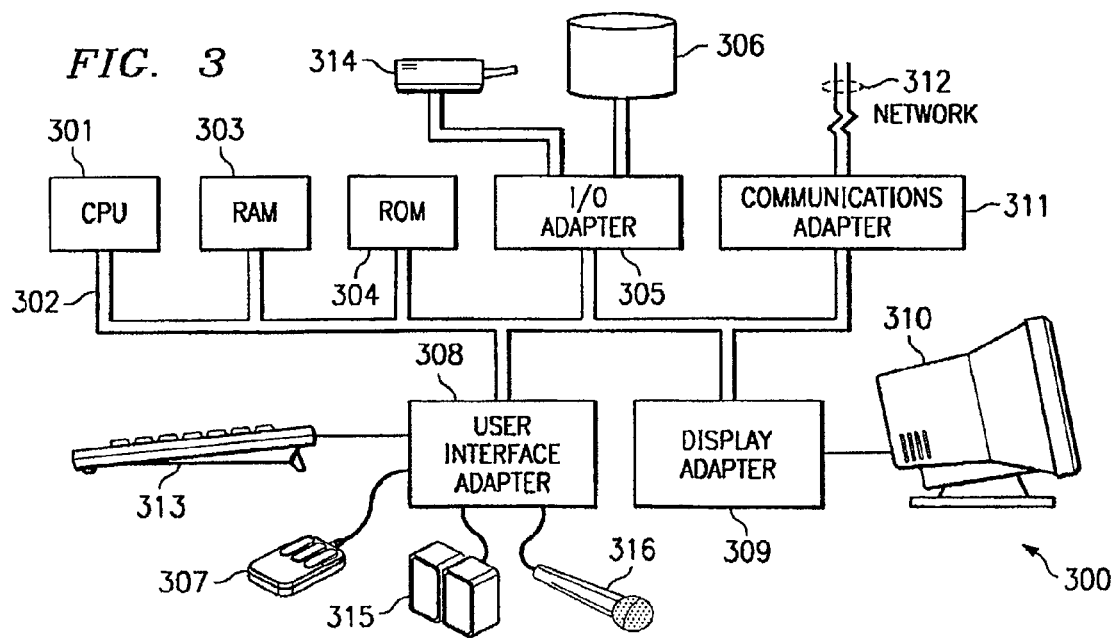
FIG. 3 shows a processor-based system adapted for use according to embodiments of the present invention.

FIG. 3 illustrates computer system 300 adapted to host link space management systems and/or agents of the present invention. Central processing unit (CPU) 301 is coupled to system bus 302. The CPU 301 may be any general purpose CPU, such as a processor from the Intel PENTIUM family of processors. However, the present invention is not restricted by the architecture of CPU 301 as long as CPU 301 supports the inventive operations as described herein. Bus 302 is coupled to random access memory (RAM) 303, which may be SRAM, DRAM, or SDRAM. ROM 304 is also coupled to bus 302, which may be PROM, EPROM, or EEPROM. RAM 303 and ROM 304 hold user and system data and programs as is well known in the art.

Bus 302 is also coupled to input/output (I/O) controller card 305, communications adapter card 311, user interface card 308, and display card 309. The I/O adapter card 305 connects to storage devices 306, such as one or more of a hard drive, a CD drive, a floppy disk drive, a tape drive, to the computer system. The I/O adapter 305 is also connected to printer 314, which would allow the system to print paper copies of information, such as fault reports, performance reports, and/or advisory reports according to the present invention. Note that the printer may be a printer (e.g. dot matrix, laser, etc.), a fax machine, or a copier machine. Communications card 311 is adapted to couple the computer system 300 to network 312, such as may be any of the aforementioned networks. User interface card 308 couples user input devices, such as keyboard 313, pointing device 307, and microphone 316, to the computer system 300. User interface card 308 also provides sound output to a user via speaker(s) 315. The display card 309 is driven by CPU 301 to control the display on display device 310.

Referring again to FIG. 2A, it can be seen that the illustrated embodiment of link space management system 200 comprises a plurality of functional blocks. It should be appreciated that link space management systems 200 of FIG. 2B may comprise such functional blocks, although they are not specifically illustrated therein. Moreover, it should be appreciated that various combinations of the particular functional blocks may be implemented with respect to a link space management system of the present invention, if desired. However, each link space management system of the present invention preferably comprises functionality to derive and/or utilize link space data of the present invention.

Link space management system 200 of the preferred embodiment comprises link space data 201. Link space data 201 of the preferred embodiment operates to derive link space data and to utilize the link space data in network management. For example, all node points in a wireless network have certain attributes associated with their connections in the RF domain, and link space data 201 of the preferred embodiment collects such connection attribute information from network nodes for deriving a link space view of the network. These attributes not only provide information with respect to the interconnection of the nodes, but also may be mined to determine the quality and even some physical information with respect to the link.

Link attribute information which may be collected and/or mined according to embodiments of the present invention may comprise signal strength, data error rate (e.g., frame error rate, bit error rate, etcetera), transmit power, antenna or radiation pattern, antenna and/or signal diversity characteristics (e.g., spatial diversity, angular diversity, and/or polarization diversity aspects), channel utilization, bandwidth utilization, data throughput or rate, network topology, network element capabilities and configuration, and the like. For example, information with respect to a link's signal strength may be utilized by link space data 201 as a basic indicator of the quality of the link and/or in deriving information with respect to physical and/or effective radiation proximity between the nodes of the link. Frame error rate (FER) may be utilized by link space data 201 as an indicator of link quality. Transmit power may be utilized by link space data 201 to derive information with respect to power resource usage and/or to derive information regarding the interference level with respect to other nodes/links in the network as well as external thereto. Antenna pattern information, such as may be derived from empirical data and/or as may be provided as a part of configuration information, for example, may be utilized by link space data 201 to derive information with respect to the physical direction or orientation of links as well as to derive coverage area information. Information with respect to the channels available and/or in use (such as particular frequencies available for use at particular network elements) may be utilized in deriving information with respect to radio bandwidth resources deployment and usage. Data rate information may be utilized in deriving information with respect to network traffic resources usage. Network topology information may be utilized in deriving information with respect to network connection status and/or resources usage.

For example, the signal strength of a link may be utilized by link space data 201 to determine the quality of a link. Moreover, signal strength information, perhaps used in combination with other information such as transmit power and/or data error rates, may be used by link space data 201 to derive an indication of the physical proximity between the nodes connected by the link. However, and perhaps more importantly, link space data 201 may utilize such information in determining the effective radiation distance between the nodes connected by the link, e.g., an RF propagation effective distance due to indirect wireless links, fading due to obstructions in the link path, etcetera. Link space information 201 of the preferred embodiment utilizes such link attribute information in deriving link space information which provides link-centric information with respect to wireless links of a network to thereby provide a view of the network which takes into account phenomena affecting the wireless links. Accordingly, link space information of the preferred embodiment includes not only the nodes connected by a wireless link, but also link quality information and an aspect of physical information with respect to the link.

According to the preferred embodiment, link space data 201 samples or otherwise collects data with respect to all network elements to thereby provide a robust view of the network as represented by link space data of the present invention. Accordingly, link space data 201 of the preferred embodiment utilizes information with respect to all links present in the invention, including RF links associated with sources external to the network which impinge upon elements of the network. Therefore, possible node points for collection of data and/or analysis by the present invention include not only APs or base stations providing network access and user devices under service (e.g., clients or terminal nodes), but also interference sources such as an unintended RF party (e.g., an RF source and/or receiver not under service of the network and/or not under control of the network or users thereof). Each such node is preferably presented in the link space, preferably with all possible information with respect thereto having been gathered and presented.

Link space data 201 of the present invention may comprise information in addition to the aforementioned derived link space information. For example, link space data 201 may store historical information with respect to the link space of a network in addition to the current link space. Additionally or alternatively, link space data 201 may provide a database or matrix of information for use with particular link space information. For example, a matrix of predetermined network element configurations may be correlated to particular link space situations in order to facilitate efficient management of the network. Information in such a matrix may be compiled from operation of management functionality of link space management system 200, such as optimized network configurations arrived at by fault management 202 and/or performance management 203 after iterative operation of the link space management system in response to an initial link space situation. Additionally or alternatively, information in such a matrix may be provided by prediction and/or experience with operation of other networks.

Link space management system 200 of the preferred embodiment further comprises network management functionality, such as may automatically control various elements of network 100 to optimize network operation as a function of link space information provided by link space data 201. It should be appreciated that common network management techniques generally focus on network traffic and routing problems. However, with the increasing popularity of wireless networks, a new area in network management arises in which users now should be concerned not only with the usual network information, but also with the RF domain. Accordingly, preferred embodiments of the present invention provide network management functionality with the use of the link space concept in order to help users manage the RF network properly. The illustrated embodiment of link space management system 200 includes both fault management 202 and performance management 203 providing active management of network 100. Additionally, the illustrated embodiment of link space management system 200 includes advisory module 204 providing advisory information with respect to network 100, such as to facilitate management of the network by users thereof.

Fault management 202 of the preferred embodiment provides for automatic fault management of network 100 in response to information from link space data 201. Such fault management may implement solutions with respect to a number of situations in which one or more network users or nodes experience a network communication fault, such as loss of or inability to communicate via the network. Accordingly, fault management 202 of the present invention may operate to provide maximization of coverage by the network, interference control schemes, unintended RF party detection and avoidance, etcetera.

For example, using the aforementioned link space information, a node or client currently without RF coverage in the network, such as due to location change or AP malfunction, may be detected by its RF link with neighbor node or client in the network. Additionally or alternatively, directional antenna patterns (e.g., utilizing the gain and/or directivity associated therewith) may be utilized to increase the chance of detection of node or client which is outside the original service area. By way of example, an access point such as node 102 may fail leaving a client node such as node 115 without a data link. However, link space information including information with respect to RF links $RF_{111-115}$ and/or $RF_{114-115}$ will provide information with respect to the presence of this node, node 115. Having detected a node in need of establishing a data link, fault management 202 may issue control signals to an appropriate AP and/or other network elements (such as may be determined by reference to link space information) to reconfigure the network, e.g., alter service area (cell) shape and/or size to establish a data link with the identified node. For example, another network access point such as node 101 may be reconfigured to establish a RF and data link with node 115. It should be appreciated that such reconfiguration may comprise adaptively altering antenna patterns to encompass the identified node, where such functionality is supported, altering transmit power of one or more nodes and/or controlling interference to provide a usable signal with respect to the identified node, and the like. Accordingly, fault management 202 may operate to maximize the set of nodes or clients served by a particular AP and/or by the network.

Fault management 202 may not only provide control of the network in response to a detected fault, but may also proactively operate to avoid faults or other undesired behavior. For example, by controlling antenna patterns and/or minimizing transmit power levels utilized, fault management 202 may control the network to minimize the chance of energy leaking out of a target area. Not only can such control be utilized to minimize the use of power resources and generally improve signal quality (e.g., reduce the noise floor with respect to various links) within the network, this can reduced the chance of a network signal being sniffed by an intruder and, therefore, provide increased security with respect to the wireless network. In addition, such an embodiment may be utilized to reduce the interference produced from the network system and provide a cleaner bandwidth to others operating nearby.

Fault management 202 may additionally or alternatively operate to identify unintended RF parties, e.g., nodes of a neighboring but unrelated network or sources of RF signals overlapping channels of network 100, and mitigate their affect upon the network. For example, link space data 201 may cause various APs, such as those disposed more near the boundaries of the network, to sweep their antenna patterns, sweep channels, etcetera to detect nearby unintended RF parties and include such information in the link space data. Such information may be utilized by fault management 202 to identify unintended RF parties as well as to detect strong interference sources (e.g., a node of the network presenting a strong interference source with respect to another node of the network). Additionally or alternatively, fault management 202 may utilize link space information with respect to RF links present at boundary nodes to identify unintended RF parties. Fault management 202 preferably controls various network elements to avoid or otherwise mitigate interference associated with identified unintended RF parties. For example, fault management 202 may control particular nodes subject to interference by an identified unintended RF party to use channels which are substantially isolated from interference from the unintended RF party. Similarly, fault management 202 may control particular nodes subject to interference by an identified unintended RF party to increase transmit power levels to provide a satisfactory signal to noise ratio in the presence of interference from the unintended RF party.

It should be appreciated that operation of various aspects of the preferred embodiment management functionality may be in combination with other functionality of a link space management system of the present invention. For example, fault management 202 may operate to establish a channel use scheme for avoiding interference from an identified unintended RF party in combination with providing a notification or other advisory information to a user of network 100.

Performance management 203 of the preferred embodiment provides for automatic performance management of network 100 in response to information from link space data 201. Such performance management may implement solutions with respect to a number of situations in which one or more network users or nodes experience network performance issues, such as decreased data throughput. Accordingly, performance management 203 of the present invention may operate to provide adaptive cell shape control and load balancing between APs of the network, automatic frequency reuse planning, reduction of problems associated with hidden terminals, etcetera.

For example, using the aforementioned link space information, loads within the network may be balanced under control of performance management 203. The location of nodes throughout the network service area will rarely be uniformly distributed. Network topology is often highly related to the relative location between the nodes, e.g., the APs and the client nodes they serve, often resulting in an unbalanced situation among the APs. By way of example, nodes 111, 112, and 114 are all shown being served by an access point node 101, whereas another network access point, node 102, is shown serving only node 115. Performance management 203 may provide control signals to appropriate ones of the network elements, such as control signals to appropriate ones of the APs for adjustment of antenna patterns and/or transmit power, and thereby adjust portions of the service area (cell) in shape and size. Such control may be utilized to transfer client nodes from highly loaded APs to more lightly loaded neighboring APs without scarifying link quality between the nodes. For example, node 101 may be controlled to terminate data link $D_{101\text{-}111}$ with node 111 and node 102 controlled to establish a data link thereto. The aforementioned data links may be terminated and established through control of the APs and/or client nodes antenna patterns and/or transmit power to eliminate RF link $RF_{101\text{-}111}$ between nodes 101 and 111 and create a new RF link ($RF_{102\text{-}111}$, not shown) between nodes 102 and 111. Additionally or alternatively, data links may be terminated and/or established without reconfiguration of RF links.

Frequency bandwidth is typically a scarce resource in wireless communications. Accordingly, performance management 203 of the preferred embodiment may utilize link space information to determine and deploy a channel reuse scheme which allows optimum reuse of this limited resource while minimizing interference. Utilizing the link space information, channel reuse schemes can be derived and updated automatically by performance management 203.

Problems associated with "hidden" terminals, e.g., nodes that are unseen by other nodes due to configurations in which nodes of the same network cannot communicate directly with one another, are well-known in the wireless technologies. By way of example, client nodes 112 and 114, although communicating with a same access point node 101, are disposed such that they may not be able to directly detect one another. However, each may utilize a same channel when communicating with node 101. If these nodes implement a media access technique such as carrier sense with collision avoidance (CSMA/CA), as is utilized by the IEEE 802.11 protocol, each of nodes 112 and 114 may transmit at a same time on a same channel without detecting the collision. However, node 101 will experience the interfering signals of nodes 112 and 114. However, utilizing link space information of the present invention, providing a link-centric view, performance management 203 of the preferred embodiment may control network elements to avoid or mitigate the problems of hidden terminals. For example, performance management 203 may effect a re-grouping of nodes, such as to associate each of nodes 112 and 114 with a different access point node. Additionally or alternatively, performance management 203 may utilize channel allocation, e.g., control nodes 112 and 114 to utilize orthogonal channels, in order to redress the hidden terminal problem. Such orthogonal channels may be different in frequency, time, code, etcetera. Accordingly, embodiments of the present invention may establish a timing and/or frequency plan to facilitate hidden nodes communicating without interference.

Advisory module 204 of the preferred embodiment provides for output of advisory information regarding the operation of network 100 in response to information from link space data 201. Such an advisory module may provide advisory information with respect to the current operation of the network and/or may proactively make recommendations to a user thereof how performance or other metrics may be improved. Accordingly, advisory module 204 of the present invention may operate to provide network condition presentation, network optimization advice, unit and fault notification, etcetera. Preferably, advisory information provided according to the present invention comprises link space detail and/or is derived therefrom, such as to include information with respect to data links as well as RE links not utilized in providing data links, effective radiation distances, user locations in the link space, etcetera, to thereby provide a robust and multi-dimensional view of the network.

The preferred embodiment active network management tools, such those providing the aforementioned fault management and performance management functionality, help alleviate the heavy network management workload from users. However, user intervention with respect to various network management issues may still be desired to further improve the network performance or to deal with some serious network fault. Therefore, advisory module 204 of the preferred embodiment provides information to guide a user in fine tuning the network.

The link space concept of the present invention preferably presents the relationships between nodes in the whole network. By graphically representing the link space, advisory module 204 can provide users a complete picture of the topology of the network (preferably representing the effective radiation proximity of the nodes). Moreover, such a graphical network topology representation may be utilized by advisory module 204 to present information with respect to the current status of the network, e.g., currently established data links, the throughput of data links, the error rate associated with transmission over data links, amounts of bandwidth or data traffic sourced by and/or directed to nodes, and the like. Such current status information allows users to easily keep track of the network condition. It should be appreciated that, although a preferred embodiment has been described herein with respect to graphical reports of a network topology and/or network condition, embodiments of the present invention may use additional or alternative means of providing such information, including textual and audio based advisory reports. Moreover, it should be appreciated that presentation of advisory information according to the present invention may be via any number of media, including presentation of information upon a computer display, transmission of e-mail notification, transmission of a message via a pager network, establishing an outbound telephone call, provide a facsimile transmission, and the like.

In addition to or in the alternative to providing the relatively general network information set forth above, advisory modules of the present invention may provide more specific advisory information for solving a particular network problem and/or for addressing particular performance issues. For example, advisory module 204 may utilize link space information to determine that an ideal deployment of APs has not been implemented and suggest changes to redress the situation. In one such scenario, advisory module 204 may determine that a particular AP is a redundant AP, e.g., an AP is deployed in an area which is adequately served by one or more other APs having sufficient capacity to serve the nodes of the redundant AP, and therefore identify the unnecessary AP and suggest its removal. Such action may actually provide an increase in network capacity by eliminating interference and channel contention issues. Channel reuse planning and/or control of network elements, such as powering down the unnecessary AP, provided by link space management system 200 may mitigate or eliminate interference and channel contention issues. Accordingly, in addition to providing advisory information, link space management system 200 may operate to control network elements and thereby redress the identified situation autonomously.

Similarly, advisory module 204 may utilize link space information for reporting user distribution. For example, loading of the APs in combination with information regarding the topology and effective radiation proximity of the nodes may be utilized in making suggestions with respect to long term AP location and arrangement.

Additionally or alternatively, advisory module 204 may utilize link space information to determine that an AP has malfunctioned. For example, advisory module 204 may compare current RF and/or data link information of the link space to historical RF and/or data link information to determine that an AP has failed, and therefore identify the malfunctioning AP and suggest replacement. By way of example, link space management system 200 may utilize information with respect having not received data from node 115 and/or information with respect to RF link $RF_{102-115}$ and/or data link $D_{102-115}$ no longer being present to conclude that node 115 has suffered a failure. However, this information alone presents a somewhat subjective view of the status of node 115. For example, RF link $RF_{102-115}$ may be temporarily blocked, causing all the aforementioned symptoms. Link space information of the present invention provides a more complete picture of the situation. For example, link space information with respect to RF links $RF_{111-115}$ and $RF_{114-115}$ in a historical database may be compared to a current link space view to conclude that node 115 has failed. In contrast, if RF links $RF_{111-115}$ and $RF_{114-115}$ continue to be present, link space management system 200 may conclude that node 115 is operational, but that some other fault exists. In addition to providing a less subjective view of the status of the network, link space information analysis according to the present invention may provide useful insight where less robust systems cannot. For example, in many situations an ability to collect information may terminate with the failure. Accordingly, the use of only direct information with respect to a node may allow only for inferential determinations, e.g., based upon the lack of updated information a conclusion is drawn. However, the link space information of the present invention utilizes collected information regarding the affected node, albeit indirect e.g., receiving data from a still operable node with respect to the node in question, to arrive at conclusions regarding the status of network elements.

Likewise, advisory module 204 may utilize link space information to recognize the presence of a strong interference source and/or unintended RF parties. For example, advisory module 204 may analyze data error rates and/or other indications of link quality and correlate particular links having poor link quality to a source of strong interference, and therefore indicate the location (e.g., proximity calculation from SNR), frequency, network ID (if possible) of an interference source or unintended RF party. Accordingly, embodiments of the present invention provide notification of interference conditions, such as to allow a user to perhaps remove or mitigate the source of the interference, in addition to proactively taking steps to avoid the interference, such as discussed above with respect to fault management 202.

Advisory module 204 may utilize link space information to analyze traffic and provide capacity reporting. For example) advisory module 204 may provide warnings with respect to unmanageable traffic, e.g., traffic levels exceeding the capabilities of particular network elements or preestablished parameters, traffic levels resulting in performance degradation below a threshold amount, etcetera, whether with respect to the overall network or a particular portion of the network.

Preferred embodiments of the present invention operate to continuously or repeatedly derive link space information and/or provide network management functionality in order to recognize and/or adapt to changes in the network. For example, some or all of the nodes may comprise mobile platforms, such as PDAs or notebook computers, thereby constantly presenting changes in loading, interference, hidden terminals, etcetera. Embodiments of the present invention implement aspects of the above functionality throughout operation of the network in order to provide a dynamic network management system.

It should be appreciated that, in addition to or in the alternative to providing the aforementioned network management functionality, link space information of the present invention may be utilized in implementing wireless distribution systems (WDS) and adhoc wireless networking. For WDS or adhoc wireless networking, all RF links in the network are candidates for providing network connections. In order to provide the best network routing strategy, information from the link space is preferably utilized in calculating the path cost and, therefore, in determining the particular RF links to utilize in establishing data links and in determining the network routing to be used.

Similarly, the link space data of the present invention may be utilized in providing a location based service platform. As mentioned above, link space information may provide proximity and direction information with respect to nodes of the network, such as from information regarding signal strength, antenna patterns, transmission power, etcetera collected from the network nodes. Using this link space information, a fairly precise estimation of the relative location of one node to other nodes can be derived. This information may be utilized in providing a solid foundation any location based service in the future.

It should be appreciated that the present invention is not limited in applicability to any particular network. Accordingly, embodiments of the present invention may be deployed with respect to cellular telephone networks, wireless computer networks, pager networks, or any other network implementing wireless links.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for providing link space data with respect to wireless links in a network, said method comprising:
   collecting a plurality of wireless link attributes with respect to all wireless nodes of the network;
   determining wireless links between nodes of the network, wherein said determined wireless links comprise all data links between nodes of the network and at least one RF link for which no data link is established;
   determining link quality of said data links between nodes of the network using at least a portion of the collected plurality of wireless link attributes;
   determining effective radiation proximity of said wireless nodes using at least a portion of said collected plurality of wireless link attributes and said determined wireless links; and
   presenting a link space representation of the network using said determined wireless links, said determined link quality, and said determined effective radiation proximity, wherein said link space representation includes a current status of all data links for said nodes of the network, link quality for said wireless links, and effective radiation proximity of said wireless nodes.

2. The method of claim 1, wherein said plurality of wireless link attributes collected comprise signal strength.

3. The method of claim 1, wherein said plurality of wireless link attributes collected comprise data error rate.

4. The method of claim 1, wherein said plurality of wireless link attributes collected comprise transmit power.

5. The method of claim 1, wherein said plurality of wireless link attributes collected comprise antenna pattern.

6. The method of claim 1, wherein said plurality of wireless link attributes collected comprise channel usage information.

7. The method of claim 1, wherein said plurality of wireless link attributes collected comprise data rate.

8. The method of claim 1, wherein said plurality of wireless link attributes collected comprise a connection status.

9. The method of claim 1, wherein said plurality of wireless link attributes collected comprise a link diversity attribute.

10. The method of claim 1, wherein said effective radiation proximity is a function of propagation phenomena of said wireless links.

11. The method of claim 1, further comprising:
    deploying a centralized system in communication with a plurality of said nodes for performing said collecting wireless link attributes, determining wireless links, and determining effective radiation proximity steps.

12. The method of claim 11, further comprising:
    deploying software agents with respect to ones of said plurality of nodes, wherein said software agents are in communication with said centralized system, and wherein said software agents are configured to be accepted by the ones of said plurality of nodes for collecting wireless link attributes of said plurality of wireless link attributes without alteration of a hardware configuration of the network nodes.

13. The method of claim 12, wherein said agents operate to collect at least a portion of said plurality of wireless link attributes.

14. The method of claim 13, wherein said agents further operate to adjust operational attributes of said network under control of said centralized system.

15. The method of claim 1, further comprising:
    deploying a distributed architecture system at a plurality of said nodes for performing said collecting wireless link attributes, determining wireless links, and determining effective radiation proximity steps.

16. The method of claim 15, further comprising:
    providing data communication between said plurality of nodes to thereby provide cooperation between portions of said distributed architecture system in providing said link space data.

17. The method of claim 1, further comprising:
    using said link space data in providing automated management of said network.

18. The method of claim 17, wherein said automated management of said network comprises:
    controlling at least one wireless link attribute associated with a wireless node of the network selected from the group consisting of a transmit power, an antenna pattern, channel usage, data rate, and connection status.

19. The method of claim 17, wherein said automated management of said network comprises:
    providing frequency planning using said link space data with respect to all nodes of said network.

20. The method of claim 17, wherein said automated management of said network comprises:
    controlling network attributes to provide operational attributes from the group consisting of providing load balancing with respect to at least one network element, maximizing coverage of nodes by the network, minimizing coverage of areas not having nodes of said network, detecting unintended RF parties, and reducing occurrence of hidden terminal interference.

21. The method of claim 1, further comprising:
    using said link space data in providing advisory output with respect to configuration of said network.

22. The method of claim 1, further comprising:
    using said link space data in configuring a wireless distribution system.

23. The method of claim 1, further comprising:
    using said link space data in a location based service platform for providing a location based service to a node based at least in part on the determined effective radiation proximity for that node.

24. The method of claim 1, wherein said determined effective radiation proximity of said wireless nodes is utilized in providing user link space location information, wherein said user link space location information comprises direction and distance information.

25. The method of claim 1, wherein the link space representation includes representation of at least one node not part of the network, wherein an RF link of the at least one RF link for which no data link is established is associated with the at least one node not part of the network.

26. A system for providing link space data with respect to wireless links in a network, said system comprising:

data collectors in communication with nodes of said network and collecting wireless link attributes therefrom, wherein the data collectors comprise software agents configured to be accepted by the network nodes for collecting wireless link attributes of said plurality of wireless link attributes without alteration of a hardware configuration of the network nodes; and a processor-based system operable to accept said collected wireless link attributes and identify wireless links between nodes of the network therefrom, said processor-based system also operable to determine effective radiation proximity of said wireless nodes using at least a portion of said collected wireless link attributes, wherein the processor-based system is further operable to provide a location based service to a node of said nodes based at least in part on the determined effective radiation proximity for that node.

27. The system of claim 26, wherein said wireless link attributes collected comprise at least one attribute selected from the group consisting of signal strength, data error rate, transmit power, antenna pattern, channel usage information, data rate, a connection status, and a link diversity attribute.

28. The system of claim 26, wherein said identified wireless links comprise all data links between nodes of the network and at least one RF link for which no corresponding data link is established.

29. The system of claim 28, wherein said wireless links comprise RF links between nodes of the network and RF devices external thereto.

30. The system of claim 26, wherein said effective radiation proximity is a function of propagation phenomena of said wireless links.

31. The system of claim 26, wherein said processor-based system comprises a centralized system in communication with a plurality of said nodes.

32. The system of claim 26, wherein said processor-based system comprises:
a plurality of processor-based systems deployed in a distributed architecture.

33. The system of claim 32, wherein said plurality of processor-based systems comprise a plurality of said nodes.

* * * * *